Figure 1:
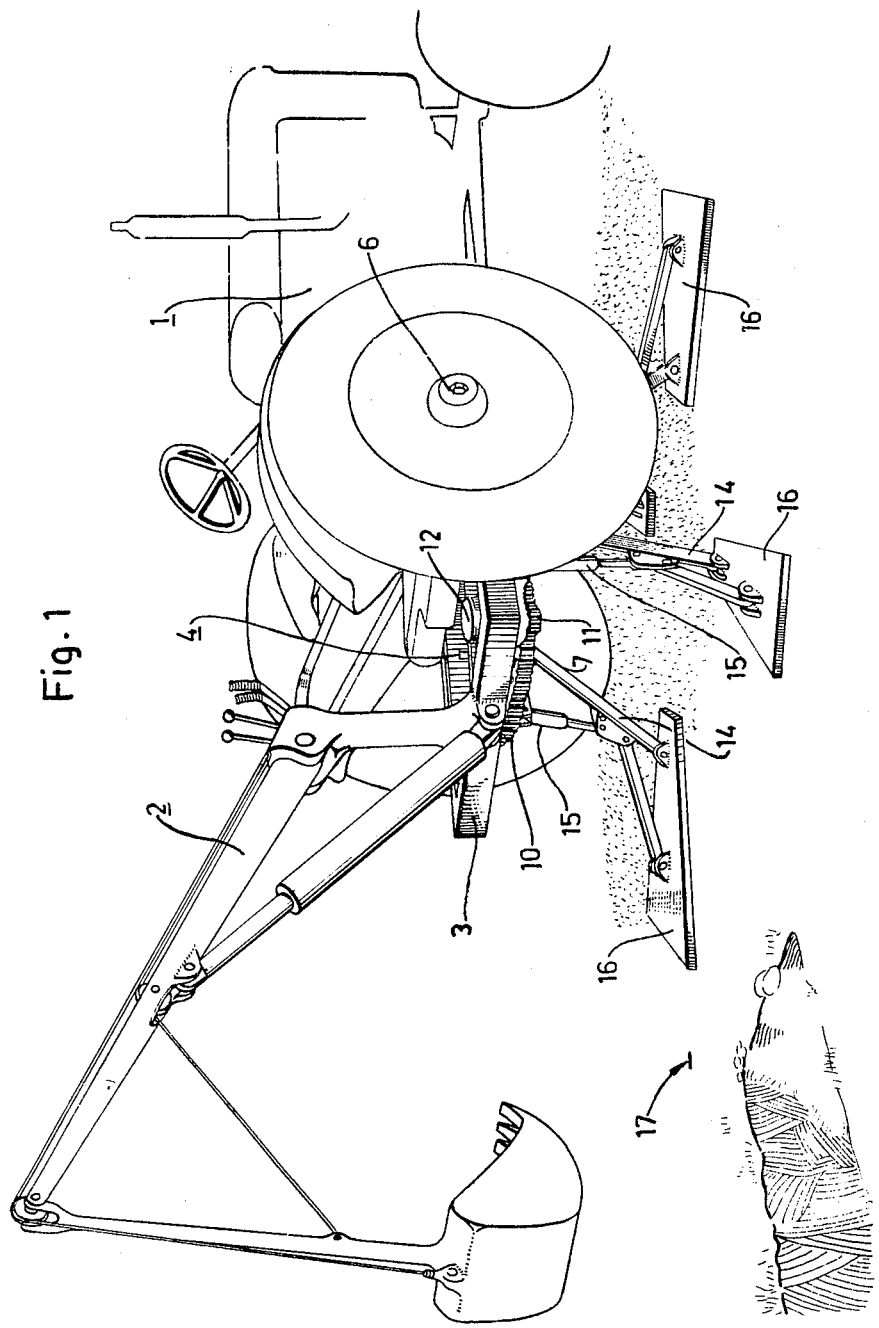

July 19, 1966  J. T. SONERUD  3,261,478
JACKING DEVICE FOR VEHICLES
Filed March 10, 1964  2 Sheets-Sheet 1

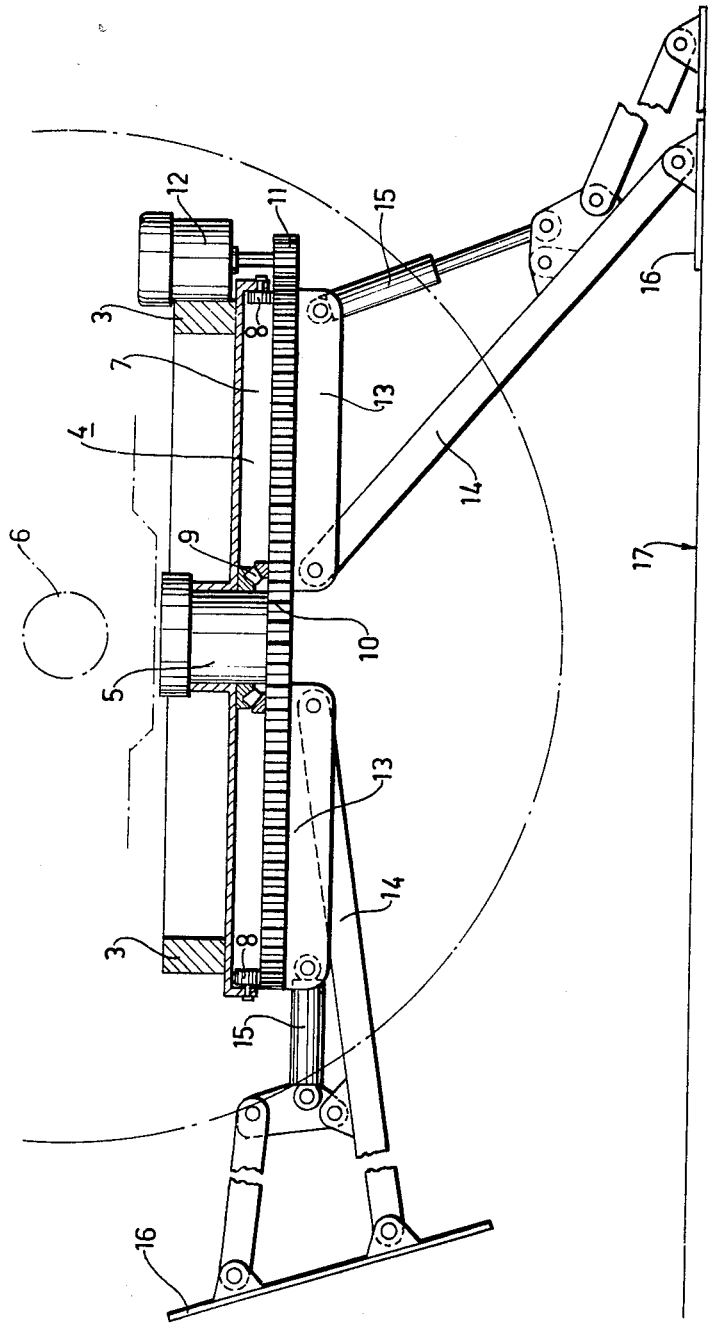

3,261,478
JACKING DEVICE FOR VEHICLES
John Teodor Sonerud, Hudiksvall, Sweden, assignor to Svenska Hymas Aktiebolag, Hudiksvall, Sweden, a corporation of Sweden
Filed Mar. 10, 1964, Ser. No. 350,902
5 Claims. (Cl. 212—145)

The present invention refers to a device for vehicles, which carry working machines, especially digging machines, etc. It is nowadays very usual to furnish tractors etc. with digging machines and loading machines of small capacity. The digging machines are usually rotatably mounted at the rear of the tractor, behind the operator's compartment. In this manner equipped tractors are usually fitted with means like ground plates arranged to press against the ground and form ground supports for the tractor during the digging or loading operation. Digging machines of this type usually have a maximal turning angle of 180°. The turning angle is limited due to the fact that the digging arm pushes against the rear part of the tractor in the outer positions. However, this turning angle cannot very often be utilized during operation on account of the fact that when digging is performed in these outer positions the digging arm has not enough counterweight for the load and consequently the tractor is apt to turn over. This is a serious disadvantage when the digging place is at an angle of 180° from the loading place.

The object of the present invention is to eliminate said disadvantages and to provide a construction that is stable in all operating positions and which has all the advantages of previous constructions.

The present invention relates to a device for vehicles, for instance tractors, that serves as a support for working machines, particularly digging machines etc., characterized in that the vehicle is provided with a ground support so arranged, that the vehicle may be raised from the ground-level and be swung substantially in the horizontal plane around said ground support, which, at the same time, serves as a supporting means for the working machine mounted on the vehicle.

The ground support consists preferably of a carousel device mounted in the common balancing point of the vehicle and the working machine and is provided with plates or feet for supporting these two units.

The present invention is now going to be described in detail with reference to an example of application shown in the submitted drawings, where:

FIG. 1 is a perspective view of a digging unit mounted on a tractor and provided with a device according to the invention, and FIG. 2 is a part section of the carousel device.

The tractor shown in the drawing is indicated with the reference number 1 and the digging apparatus mounted on the tractor with number 2. The digging apparatus 2 is mounted in a fixed frame 3 on the tractor 1. In the center of this frame is a carousel device 4 arranged on a vertical axle spindle 5, situated under the rear axle 6 of the tractor. The carousel device 4 also includes a circular platform 7, on which backing rollers 8 are adapted to run. The axle 5 is rigidly mounted in the platform 7, a tapered roller bearing 9 being disposed between the platform 7 and the axle 5. The peripherical edge of the platform 7 is adapted with a gearing 10, cooperating with a gear 11, that is connected to a drive motor 12, mounted in the frame 3. Four flanges 13 supporting four separate linkages 14 and hydraulic cylinders 15 are disposed on the underside of the platform 7. The free ends of the linkages include support plates 16, arranged to press against the ground surface 17. In FIG. 2 the left link device 14 is indicated with the ground support plate 16 raised and the right link device lowered.

The device operates in the following manner. The ground support plates 16 with linkage 14 are set in a raised position and the tractor is driven to the excavation. The operator brings the hydraulic cylinders 15 into operation, which lowers the support plates 16 and forces them against the ground 17 to such extent, that the entire tractor including the digging apparatus is lifted and the tractor wheels loose contact with the ground. The hydraulic cylinders 15 are preferably operated separately in order to be able to correct the lifting height and to allow for uneveness of the ground. In this manner it is always possible to place the carousel device in a horizontal position. The tractor is now resting through the rollers 8 and the roller bearing 9 on the platform 7. The digging may now be started. From the drawing it will be apparent that the front part of the tractor and the motor will act as a counterweight for the digging unit and its load during the digging. When turning the digging unit towards a dumping place, the motor 12 is started and the whole tractor including the digging unit will swing around the axle 5 through the carousel device 4. The balance between the tractor and the digging unit will not change during the whole swinging movement due to the fact that the digging unit is rigidly anchored in the longitudinal direction of the tractor. Any tendency to turn over as by previously known devices of this kind due to insufficient counterweight during digging or dumping cycles, does not exist. Furthermore, the tractor as well as the digging unit, may be rotated a complete turn.

In the application shown, the digging unit 2 is mounted in the frame attached to the carousel device. Naturally, the digging unit may be anchored in some other manner to the tractor and the entire carousel device including the ground support plates may form a separate unit that may be disposed at the balance point in the undercarriage of the tractor and the digging unit. The invention is naturally not restricted to tractors only. Other types of vehicles like trucks, lorries etc., may also be used. Furthermore, the digging unit is just an example of application and other working machines like loading machines etc. may be mounted. The most important feature regarding the present invention is a device for raising and swinging the vehicle including the working machine in the horizontal plane to desired angle positions.

What is claimed is:
1. In combination with a vehicle having wheels for locomotion, a mechanism for raising the vehicle above a surface supporting the vehicle and for turning the vehicle about an upright axis when the vehicle is in a raised position, comprising; a turntable rotatably mounting the vehicle for rotation of the vehicle about said upright axis, a plurality of feet mounted on said turntable, means for individually extending each of the feet to a first set of positions in contact with the support surface and for individually retracting each of the feet to a second set of positions out of contact with the support surface, whereby when the feet are in the first set of positions the vehicle is wholly supported by the feet, with said wheels being out of contact with the support surface, said vehicle including said wheels being rotatable on said turntable about said upright axis, and when the feet are in the second set of positions the vehicle is wholly supported by the wheels to be freely movable on the support surface.

2. In combination with a vehicle having wheels for locomotion, a mechanism according to claim 1 wherein each of said feet comprises a leg swingably mounted on said turntable and a flat supporting member swingably mounted on the free end of the leg for engaging the supporting surface.

3. In combination with a vehicle having wheels for locomotion, a mechanism according to claim 1 wherein said axis is vertical.

4. In combination with a vehicle having wheels for locomotion, in which said vehicle is a tractor, a mechanism according to claim 1.

5. In combination with a vehicle having wheels for locomotion, in which said vehicle is a tractor mounting a digging device, a mechanism according to claim 1.

References Cited by the Examiner

UNITED STATES PATENTS

| | | | |
|---|---|---|---|
| Re. 25,538 | 3/1964 | Soyland et al. | 214—138 |
| 1,509,212 | 9/1924 | Keightley et al. | 254—87 |
| 1,653,247 | 12/1927 | Zollinger | 254—87 X |
| 1,930,959 | 10/1933 | Potvin et al. | 254—87 |
| 1,953,442 | 4/1934 | Sorescu et al. | 254—87 |
| 2,967,045 | 1/1961 | Axman | 254—87 |
| 3,100,049 | 8/1963 | Garnett | 212—145 |
| 3,175,698 | 3/1965 | Dossler | 212—145 |

EVON C. BLUNK, *Primary Examiner.*

SAMUEL F. COLEMAN, *Examiner.*

A. L. LEVINE, *Assistant Examiner.*